March 23, 1926. 1,577,879
C. G. STEVENS
OPTOMETRICAL TEST TARGET
Filed Dec. 26, 1922 2 Sheets-Sheet 1
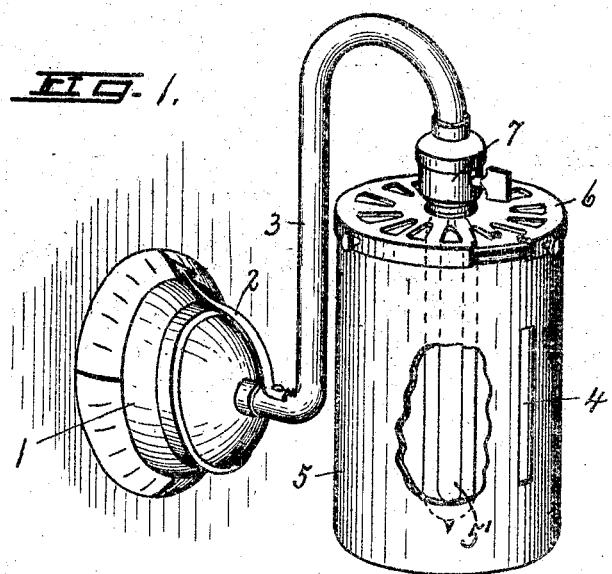
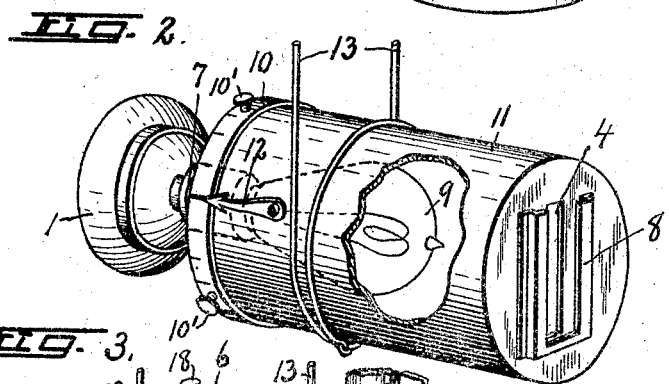
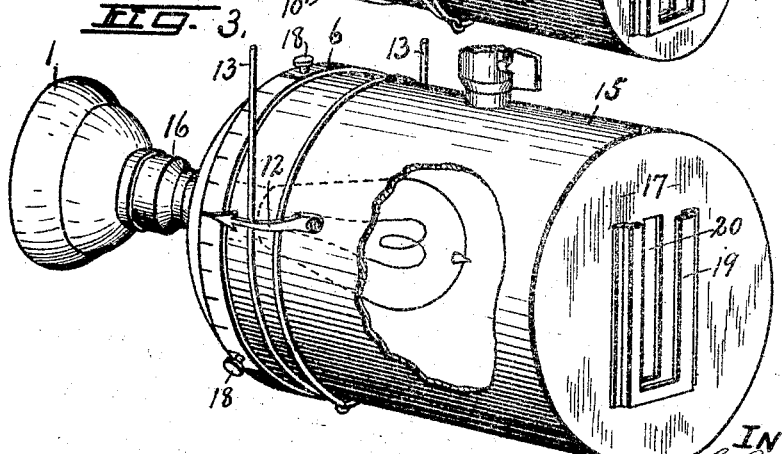

March 23, 1926.
C. G. STEVENS
1,577,879
OPTOMETRICAL TEST TARGET
Filed Dec. 26, 1922    2 Sheets-Sheet 2
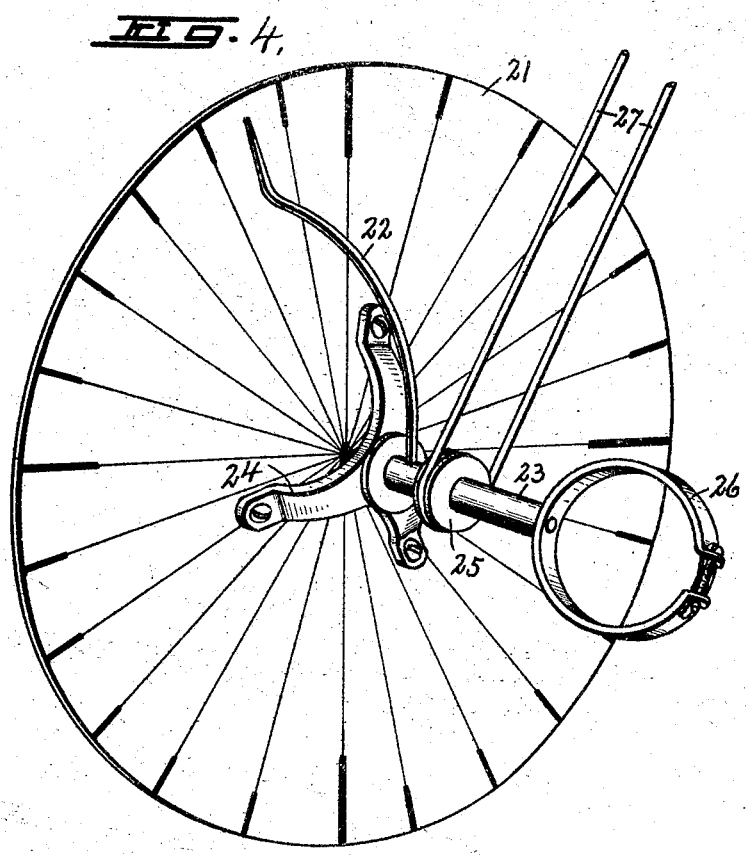

Patented Mar. 23, 1926.

1,577,879

UNITED STATES PATENT OFFICE.

CALVIN GAY STEVENS, OF OSBORNE, KANSAS.

OPTOMETRICAL-TEST TARGET.

Application filed December 26, 1922. Serial No. 608,994.

*To all whom it may concern:*

Be it known that I, CALVIN G. STEVENS, of Osborne, in the county of Osborne, in the State of Kansas, have invented new and useful Improvements in Optometrical-Test Targets, of which the following, taken in connection with the accompanying drawings, is a full, clear, and exact description.

My invention relates to devices and mechanisms for detecting the presence of, and for correcting, any error of refraction in the human eye.

My object is to provide a target for the use and benefit of individuals at home or in public so that he may make a reliable self test of his vision with or without spectacles and, provided he is not color defective or color blind, may thereby determine whether he has erythropsia myopia, hypermetropia, emmetropia or a faulty centering of the eye lens or of the spectacle lens, and whether his eyes or his spectacles, are probably right or certainly wrong, one or more of these errors being positively indicated by his seeing red or pink in the target.

Another object also is to provide ways and means for both detecting, and correcting with lenses any error of refraction or decentering of the lens of the eye by using as a test target a straight and preferably a very narrow line of light which is transmitted through glass directly to the eye from the incandescent filament of an electric lamp or, through a very narrow aperture in a screen on the lamp, the glass being tinted or painted to exclude from passage mainly, if not entirely, all colors excepting red and violet so that an average myope sees in the red-violet line of light a central line of pink or red, bordered with violet or blueish white lines; the average hyperope sees in the line of red-violet a central line of "white" "blueish white" or violet bordered by red lines; in the disease "erythropsia" he sees all colors more or less tinted red; a faulty decentering of the lens of his eye or of his spectacle lens causes him to see more red on one than the other side of the line of red-violet light; the normal or fully corrected eye sees one distinct line of "purple," "purplish," "blueish-white" or "nearly white" color.

Other objects and uses will be brought out in the following description.

In the drawings:—

Figure 1 is a perspective view of one form of apparatus for carrying out the objects stated.

Figure 2 is a perspective view of a modified form of apparatus.

Figure 3 is a perspective view of a further modified device for carrying out the same objects, and Figure 4 is a perspective view of a device for supporting the lamp or lamps and screen attachments shown in Figures 1, 2 and 3.

I utilize the well known fact that violet is most, and red least refracted by any lens, in a somewhat similar way to its use in the chromatic test described in books on optometry, in which a circular area, e. g. 3/4" diameter of red-violet light is the test target, the retinal image of which is a more or less distinct circle formed by action of all the muscles affecting the curvatures of all the refracting meridians of the eye, the action of the muscles on one meridian affecting other meridians, one meridian affecting another, whereas I use a straight line or slit as narrow as practicable of red-violet light which is focused only by the meridians perpendicular to it, and therefore, with less or no disturbance of the muscles of accommodation, and with less confusion and stress on the patient in determining what colors and where the red or violet is seen, and allowing the examiner to complete the test of one or several meridians with greater ease, accuracy and speed than has heretofore been practiced. I obtain lines of mainly red-violet light by coloring the bulbs of electric lamps or by using an opaque screen on the electric lamp with line apertures holding a glass colored so as to transmit mainly, only the red and violet rays from the incandescent line filament.

To merely determine the presence or probable absence of any error and for individual tests at home or in public I preferably use electric lamps with single loop filaments, of any power, safe for the eye at the distance viewed, in an electric fixture in which the bulb is composed of tints, or its outer or inner surface colored, so as to transmit almost entirely, if not solely, the red and violet colors in proper proportion as may be determined by common optical apparatus, or may be roughly estimated by the inspector viewing the process of painting or dipping through a prism of 5 or 10 degrees or through a lens which gives him an artificial hyperopia of 1.00 D.

Red, pink or violet appearing in, near or bordering the filaments in these tinted or painted lamps with either eye, at any distance, with or without spectacles, is positive proof of error of the eyes or of the spectacles, while the absence of pink or red in the lamps is negative proof.

For both detecting and correcting any error of refraction by a line of red-violet light and trial lenses, I prefer to use a tubular bulb with hair-pin shape, single loop, filament, fixed at its tip, to secure a straight line of red-violet light through the colored bulb. Place any one of the mechanisms described in the drawings, on a level with the patient's eyes at 20 feet in a dark room, occluding one eye with an opaque disc in a trial frame and placing the line or lines of light visible to patient at 90 degrees on the degree scale, by means of a handle pointer or by suitable cables attached to a rotatable screen, and to test the patient for color blindness or defects in color perception and also to illustrate violet to him, I place a prism of 10 degrees base out or in before either uncovered eye. If the patient does not recognize violet toward the apex and red toward the base of the prism he is rejected from this test.

In case hyperopia or myopia is indicated the cylindrical lens, axis 90 degrees, which eliminates all red, pink, or violet from the line of light is the full lens correction for the meridian tested. In the same way each or all the meridians may be corrected until each shows the red-violet line of light as a single distinct "purple", "purplish", "blueish white" or "nearly white" line of light in case of faulty centering of the lens of the eye or of the spectacle lens correction is made by prisms or prism equivalents added to the lens correcting any error of refraction, according to well-known principles.

The apparatus shown in Figure 1 comprises a canopy —1— containing a suitable crowfoot similar to that shown in Figure 4, which together with the canopy is secured in a fixed position to a wall or other convenient support.

This canopy is provided with a circular scale of at least 180 degrees around which is movable a pointer —2—, said pointer being secured to a tubular supporting arm or shaft —3— having one end rotatably mounted in the apex of the canopy and its other end provided with means for receiving and supporting a hollow cylindrical screen —5— having a central lengthwise aperture —4—.

One end of the screen —5— is removably secured by suitable thumb screws to an ordinary lamp shade holder —6— of an electric lamp socket —7— which in turn is secured to the outer end of the rotary supporting arm —3— in such manner as to hold the screen —5— and electric lamp therein with its axis extending diametrically of the axis of the revolution of the arm —3—, and the elongated aperture —4— passing through the produced axis of said arm and parallel with the axis of the screen whereby the screen —5— with the aperture —4— therein may be adjusted rotarily about the axis of the canopy for a purpose presently described, the amount of angular adjustment being indicated by the pointer —2— cooperating with the graduations on the canopy.

The arm —3— together with the lamp-containing screen —5— may be rotated by hand or by any suitable mechanism operable at will.

Any suitable electric lamp as —5'— may be secured to the socket —7— to project centrally within the screen —5—, the lamp shown in Figure 1 being selected to show one straight line of incandescence along the axis of the screen and having a suitable length of say, 1½ to 2½ or more inches similar to what is commonly known as a "galvanometer" lamp and in which the bulb is colored to partially or entirely exclude all colors except red and violet from passing therethrough.

If the lamp described is not conveniently available, I may use any straight or single loop lamp, as for example, what is commonly known as "T—10—60—W" straight carbon loop so turned in its socket that the patient practically sees only one line of the light by the front part of the hairpin shaped filament covering its posterior part in the line of his vision or I may use the same lamp with its bulb screen excepting a narrow rectangular axially extending space of say 2¾ inches long by ¼ inch wide which is left clear so that the patient may see only a straight line of light in any position of angular adjustment of the screen about the axis of the canopy.

If neither of the two kinds of lamps mentioned are available I may use any loop lamp, either bare or tinted, within the screen —5— as shown in Figure 1, so that only a straight part of the filament is seen through the opening —4— which may be covered by a slide (not shown) of frosted glass, colored to produce the effect above described, said slide being movable in a suitable guide cell —8— on the front end of the screen as shown in Figure 2, or 19 as shown in Figure 3.

In the absence of lamps in which it is not convenient to isolate one straight part of the circuit, I may use any lamp of sufficient candle power preferably with its wiring in long straight parts and short curves having its bulb colored to give the effect described, and an opaque slide with a central diaphragm edged rectangular aperture of about 2¾ inches in length and 1/25 of an inch wide, together with or without frosted slides of glass colored to produce the chromatic effect desired and placed in a guide cell as —19—, Figure 3.

The apparatus shown in Figure 2 may be used in connection with any lamp of suitable candle power for the distance at which it is used and in which any common electrical fixture is used to support a lamp —9— and shade holder —10— for receiving a rotatable screen —11—, the shade holder —10— being provided with a circular scale of at least 180 degrees while the screen —11— which is rotatable in the shade holder is provided with a pointer —12— movable around the scale to indicate the relative angular adjustment of the screen, it being understood that the shade holder and its supporting means is held in a fixed position by securing it together with the lamp, to a suitable crow foot or canopy on the wall or any other available support.

The screen —11— may be rotated by hand or by any other suitable means, such as cables —13— wound around and connected to the screen and extended to any convenient position for operation, said screen being adapted to be held in its angularly adjusted position by means of set screws —10'—.

The lamp within the screen may be colored in the manner previously described or if not colored, an equivalently colored slide of glass may be inserted in the guide cell —8— to be used in connection with an opaque slide not shown but movable in the same guide and provided with a narrow elongated rectangular aperture corresponding to the aperture 4, Figure 2.

In Figure 3, the screen —15— is adapted to be rotated through an arc of 180 degrees or more by means of a cord —13— similar to those previously described, said screen being provided with a pointer —12— movable around a degree scale on the screen holder —6—, said screen —15— being adapted to be held in any position of angular adjustment by set screws —18—. The front end of the screen is provided with a guide cell —19— similar to the guide cell —8—, Figure 2, and is adapted to receive slides of glass, metal or fibre as desired to make the tests described or to make the regular chromatic and oculomotor-muscle tests, or to hold any common mechanism for adjusting the sides of a straight diaphragm aperture as —20— from contact to ⅛ of an inch. In Figure 4, is shown a convenient apparatus for receiving a lamp socket and the screen attachments shown in Figures 1, 2 and 3 and comprising a circular degree scale —21— around which is movable a pointer —22— carried by a shaft —23— which in turn is rotatably mounted in a suitable support or crowfoot —24—, the latter together with the dial —21— being secured against rotary movement to a wall or other available support.

The shaft —23— is provided with a pulley —25— and a clamping member —26—, said pulley being connected by a belt or cord —27— to any suitable motor power while the clamp —25— is adapted to receive and support any one of the screens —5—, —11— or —15— shown in Figures 1, 2 and 3, together with the lamp contained therein.

A selected paint may be used for coloring the lamp bulbs such as a special cobalt blue or the tint may be cast in the glass as now in chromatic test lens glass, to transmit only red and violet rays.

It will be seen from the foregoing description that the dominate feature of the invention is the use of a line of red-violet light for determining and correcting colors of refraction by any suitable means such, for example, as that shown in the drawings.

What I claim is:

1. In an optometrical test target for determining and correcting errors of refraction, an electric lamp, means for causing the projection of a straight line of violet light from the lamp and for adjusting said line to different angles about an axis.

2. In an optometrical test target for determining and correcting errors of refraction, an electric lamp, means for causing the projection of a straight line of violet light from the lamp and for adjusting said line to different angles about an axis, and means for indicating the degree of angular adjustment.

3. In an optometrical test target for determining and correcting errors of refraction, an electric lamp, an enveloping means therefor provided with a narrow rectangular aperture for the passage of certain rays of light therethrough, and provided with means for excluding other rays of light from transmission therethrough, said enveloping means being rotatable about an axis for angularly adjusting the aperture.

4. In an optometrical test target for determining and correcting errors of refraction, an electric lamp, an enveloping means therefor provided with a narrow rectangular aperture for the passage of certain rays of light therethrough, and provided with means for excluding other rays of light from transmission therethrough, said enveloping means being rotatable about an axis for angularly adjusting the aperture, and means for indicating the amount of said angular adjustment.

5. In an optometrical test target, a relatively stationary circular scale, an electric lamp, enveloping means for said lamp rotatable about the axis of the scale and provided with a narrow straight aperture extending across the axis of rotation, and means for causing the projection of a straight line of red violet rays from said lamp through the aperture.

In witness whereof, I have hereunto set my hand this 8th day of December, 1922.

CALVIN GAY STEVENS.